(12) United States Patent
Roben

(10) Patent No.: US 12,130,998 B1
(45) Date of Patent: Oct. 29, 2024

(54) APPLICATION CONTENT MANAGEMENT IN 3D ENVIRONMENTS

(71) Applicant: Apple Inc., Cupertino, CA (US)

(72) Inventor: Adam W. B. Roben, Swarthmore, PA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/099,300

(22) Filed: Jan. 20, 2023

Related U.S. Application Data

(60) Provisional application No. 63/301,151, filed on Jan. 20, 2022.

(51) Int. Cl.
  *G06F 3/04815* (2022.01)
  *G06F 3/01* (2006.01)
  *G06F 3/0486* (2013.01)

(52) U.S. Cl.
  CPC .......... *G06F 3/04815* (2013.01); *G06F 3/011* (2013.01); *G06F 3/0486* (2013.01)

(58) Field of Classification Search
  CPC ..... G06F 3/011; G06F 3/04815; G06F 3/0486
  See application file for complete search history.

(56) References Cited

U.S. PATENT DOCUMENTS

| | | | |
|---|---|---|---|
| 10,335,677 B2 * | 7/2019 | Fuchs | A63F 13/69 |
| 10,990,240 B1 * | 4/2021 | Ravasz | G06F 3/011 |
| 11,294,854 B2 * | 4/2022 | Farlotti | G06F 16/93 |
| 11,335,070 B2 * | 5/2022 | Baier | G06F 17/16 |
| 11,402,964 B1 * | 8/2022 | Stevens | G06F 16/9558 |
| 11,403,848 B2 * | 8/2022 | Choi | G06V 20/64 |
| 11,494,528 B2 * | 11/2022 | Bailey | G06T 19/006 |
| 11,615,637 B1 * | 3/2023 | Gaeta | G06N 20/00 |
| | | | 715/233 |
| 2013/0042296 A1 * | 2/2013 | Hastings | G06Q 50/184 |
| | | | 726/1 |
| 2013/0083003 A1 * | 4/2013 | Perez | A63F 13/216 |
| | | | 345/419 |
| 2017/0236320 A1 * | 8/2017 | Gribetz | G06F 3/011 |
| | | | 345/419 |
| 2017/0256096 A1 * | 9/2017 | Faaborg | G06T 19/003 |
| 2019/0050440 A1 | 2/2019 | Novak et al. | |
| 2019/0339837 A1 | 11/2019 | Furtwangler | |
| 2020/0258481 A1 * | 8/2020 | Woo | G02B 27/017 |
| 2020/0320794 A1 | 10/2020 | Huang et al. | |
| 2020/0356230 A1 * | 11/2020 | Turner | G06F 3/04845 |

(Continued)

*Primary Examiner* — Ryan F Pitaro
(74) *Attorney, Agent, or Firm* — Thompson Hine LLP

(57) ABSTRACT

Various implementations disclosed herein include devices, systems, and methods that facilitate the use of application content such as text, images, video, and 3D models in XR environments. In some implementations, an XR environment is provided that has user interfaces from one or more separately executing applications. A user may use a user interface from one such application to create, edit, view and otherwise use a content item, e.g., create a document with text, images, etc., view a video, surf the web to view webpage content items. However, while a content item is within the application, the content item may be restricted with respect to access by the overall XR environment and/or one or more other content applications. Implementations disclosed herein enable users to provide input to use of the content from within one content application in the XR environment and/or one or more other applications.

32 Claims, 6 Drawing Sheets

(56) References Cited

U.S. PATENT DOCUMENTS

| | | | |
|---|---|---|---|
| 2021/0081092 A1* | 3/2021 | Ikeda | G06F 3/011 |
| 2021/0124475 A1* | 4/2021 | Inch | G06F 3/04845 |
| 2021/0279953 A1* | 9/2021 | Bouhnik | G06T 19/006 |
| 2021/0279966 A1* | 9/2021 | Burns | G06F 3/04815 |
| 2021/0286427 A1* | 9/2021 | Pateriya | G06F 3/013 |
| 2021/0311545 A1* | 10/2021 | Bae | G06T 11/60 |
| 2022/0165013 A1* | 5/2022 | Velez | A63F 13/213 |
| 2022/0198764 A1* | 6/2022 | Nickerson | G06F 3/011 |
| 2022/0214743 A1* | 7/2022 | Dascola | G06F 3/011 |
| 2022/0414403 A1* | 12/2022 | Hlavac | G06F 18/22 |
| 2024/0078846 A1* | 3/2024 | Chyn | G06V 40/50 |

\* cited by examiner

APPLICATION CONTENT MANAGEMENT IN 3D ENVIRONMENTS

CROSS-REFERENCE TO RELATED APPLICATIONS

This application claims the benefit of U.S. Provisional Application Ser. No. 63/301,151 filed Jan. 20, 2022, which is incorporated herein in its entirety.

TECHNICAL FIELD

The present disclosure generally relates to electronic devices that provide content within views of 3D environments, including views that include content that is usable via one or more applications that are executed to provide separate user interfaces within such 3D environments.

BACKGROUND

Existing extended reality (XR) systems may be improved with respect to providing means for users to create, edit, view, or otherwise use content.

SUMMARY

Various implementations disclosed herein include devices, systems, and methods that facilitate the use of application content such as text, images, video, and 3D models in XR environments. In some implementations, an XR environment is provided that has user interfaces (UI) from one or more separately executing applications. A user may use a user interface from one such application to create, edit, view and otherwise use a content item, e.g., create a document with text, images, etc., view a video, surf the web to view webpage content items. However, while a content item is within the application, the content item may be restricted with respect to access by the overall XR environment and/or one or more other content applications.

Implementations disclosed herein enable users to provide input to use content from within one content application in the outside XR environment and/or within one or more other applications. For example, input in the form of a drag-and-drop gesture may move content from within an application to a 3D position in the outside XR environment, e.g., a portion of the environment that is separate from the UI of the application. In one example, a user is enabled to perform a drag-and-drop operation in a 3D XR environment to drag content outside of an app's UI to a 3D position outside of the app's UI. The content may be positioned (e.g., parked) at such a 3D position within the XR environment for subsequent use. In one example, the user is further enabled to perform a second drag-and-drop operation in the 3D XR environment to move the content from its position (e.g., its parked position in the outside XR environment) to within a second application (e.g., withing a target app's user interface).

The abilities to position content in the XR environment separate from a source application and/or to perform an application-to-application content transfer in two separate operations may enable easy and more convenient experiences for a user. For example, these capabilities may enable a user to more easily open and position a target app's UI after positioning the content in the XR environment. Rather than having to maintain an ongoing input and/or simultaneous input commands while selecting and moving content directly from an application to another unexecuted application, the user may have a simpler user experience. For example, after having dragged and dropped the content item in the XR environment, the user's input modalities (e.g., hands, input device, etc.) are free for use in opening and interacting with a target application. Since the content is positioned in the XR environment (e.g., parked), there is no need to simultaneously provide input controlling the content that is being moved (e.g., to maintain the selection and positioning of that content), while input is provided to move/close a source application and/or open/position a target application. For example, a user may simply move content to the outside XR environment with one input command, then close the source application with another command, and then open and position a target application with one or more other commands without having to simultaneously provide any of these input commands.

In other examples, content is not necessarily used by a second (e.g., target content application). Rather content may be positioned in the outside XR environment for use in enhancing the appearance and/or available features within that outside XR environment. Content may be positioned in an XR environment and remain in its position across multiple user sessions and/or lengthy time periods for potential later use. For example, a collection of movie content items may be positioned on a shelf next to a television in the XR environment to be used at a future date or just to provide a desirable appearance of an accessible movie collection with the XR environment.

In some implementations, the positioning of content moved from within an application to a position separate from the application in the XR environment is based on one or more context factors. For example, content may be positioned in different ways within the XR environment (e.g., on a surface, in the air, attached/anchored to a side of another application's UI, etc.) and the persistence of the content within the XR environment may be determined based on that positioning, e.g., content positioned in the air may persist until a first condition (e.g., end of the current user session) occurs while content positioned on a surface may persist beyond the occurrence of that first condition.

In some implementations, a processor performs a method by executing instructions stored on a computer readable medium. The method provides a user interface of a first content application (e.g., a web browser, word processor, photo editor, etc.) within an extended reality (XR) environment. The first content application may be one of multiple content applications that are individually executable to provide user interfaces at three-dimensional (3D) positions within the XR environment. For example, the first content application may be executable via an operating system that provides the XR environment with multiple applications that execute, where such applications are enabled to use their own content items but are restricted from using content items that are within other applications. The method receives input (e.g., a drag/drop, cut/paste, move, slide, remove, delete/paste or other such command) to select and move content (e.g., an image, text, file, 3D model etc.) from within the user interface of the first content application to a 3D position separate from the user interface of the first content application within the XR environment. The method determines a persistence attribute of the content in the XR environment based on a context. For example, persistence may be determined based on the position, content type, size, or other context feature of the content in the XR environment. The method provides a view of the XR environment that includes a representation of the content at the 3D position, where the representation persists within the XR environment based on the persistence attribute.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
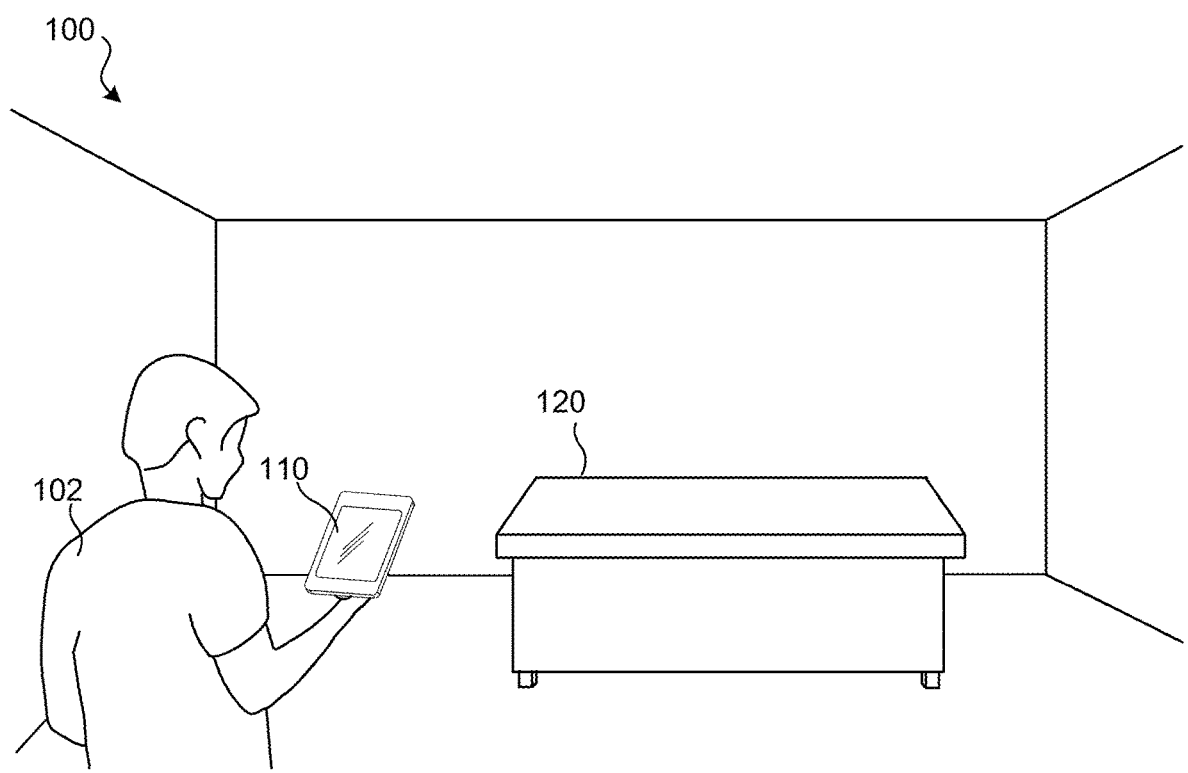
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a desk 120. The electronic device 110 includes one or more cameras, microphones, depth sensors, or other sensors that can be used to capture information about and evaluate the physical environment 100 and the objects within it, as well as information about the user 102 of the electronic device 110. The information about the physical environment 100 and/or user 102 may be used to provide visual and audio content and/or to identify the current location of the physical environment 100 and/or the location of the user within the physical environment 100. In some implementations, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

FIGS. 2-8 illustrate views of an XR environment provided by the device 110 of FIG. 1 as the device manages content according to one or more of the techniques disclosed herein.

Figure 2:
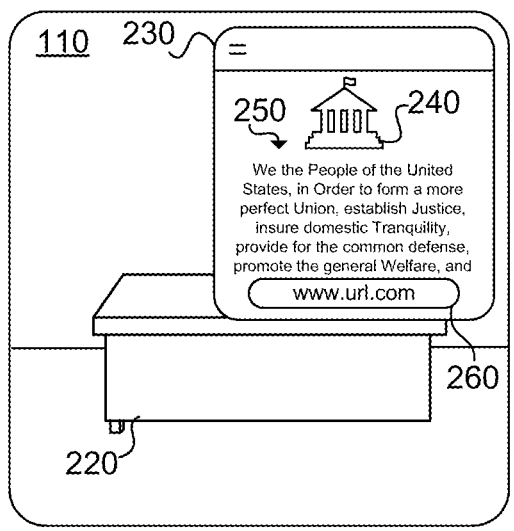
FIG. 2 illustrates a view of an XR environment provided by the device of FIG. 1 including an exemplary user interface of a content application in accordance with some implementations.

FIG. 2 illustrates a view of an XR environment provided by the device 110 of FIG. 1, including an exemplary user interface 230 of a content application and a depiction 220 of table 120. Providing such a view may involve determining 3D attributes of the physical environment 100 and positioning virtual content, e.g., user interface 230, in a 3D coordinate system corresponding to that of physical environment 100.

In the example of FIG. 2, the user interface 230 includes various content items, including an image 240, text 250, and an input field 260 for entering and/or displaying a URL corresponding to the content being displayed elsewhere in the user interface 230. For example, the user interface 230 may be a web browsing user interface of a web browser application. The user interface 230 is simplified for purposes of illustration and user interface in practice may include any degree of complexity, any number of content items, and/or 2D and/or 3D content. The user interface 230 may be provided by an application of various types including, but not limited to, a web browser application, a content viewing application, a content creation and editing application, or any other application that can display, present, or otherwise use visual and/or audio content.

Figure 3:
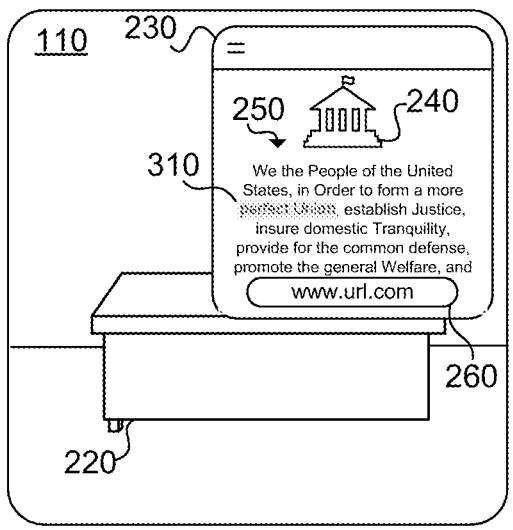
FIG. 3 illustrates a selection of content in the user interface of FIG. 2 in accordance with some implementations.

FIG. 3 illustrates a selection of content in the user interface 230 of FIG. 2. Specifically, based on user input the text 310 ("perfect Union") is selected. Such input may take a variety of forms including, but not limited to, input provided via a body movement such as a hand gesture, input based on a gaze direction or eye movement, input based on movement of device 110 or a separate device, input based on a verbal command, input based on use of a virtual input device (e.g., a virtual keyboard), or any combination of such inputs. In this example, the selected text 310 is highlighted to identify that this text has been selected. In other example, selected context is graphically distinguished via other forms of indicators (e.g., colors, bold, text effects, pointers, change in size, etc.) or is not distinguished.

Figure 4:
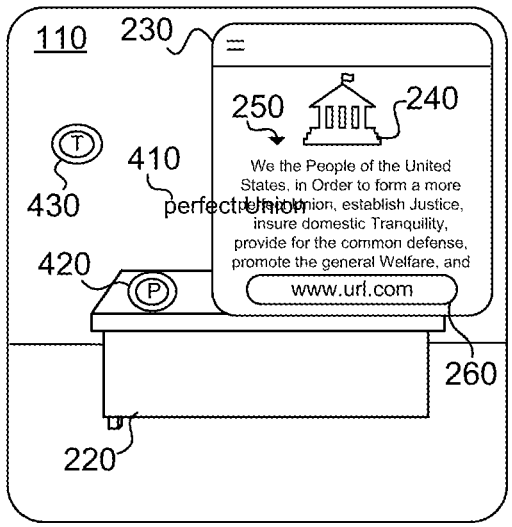
FIG. 4 illustrates moving content from the user interface to the surrounding XR environment of FIG. 2 in accordance with some implementations.

FIG. 4 illustrates further input moving the content from the user interface 230 to the surrounding XR environment. In this example, the input has dragged a copy 410 of the text 310 partially outside of the user interface 230. In response to this dragging, indicators 420, 430 are displayed at positions within the XR environment indicating 3D positions within the XR environment at which the copy 410 may be placed. In other implementations, other types of indicators of a variety of sizes, numbers, and/or types may be used to indicate such possible positions. In other implementations, indicators are additionally or alternatively used to identify 3D positions in the XR environment at which the content cannot be placed, e.g., based on one or more position restrictions or rules.

Figure 5:
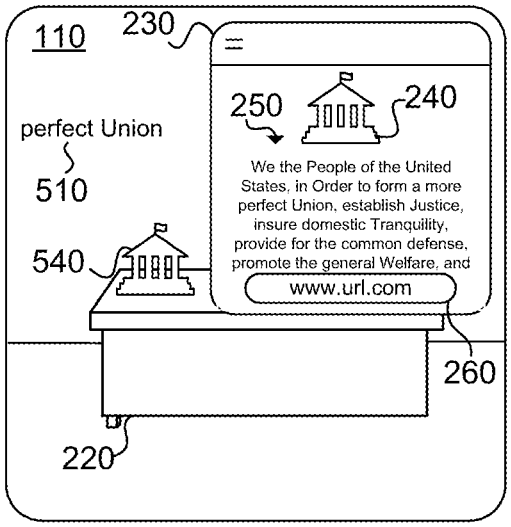
FIG. 5 illustrates content items positioned at 3D positions in the XR environment of FIG. 2 in accordance with some implementations.

FIG. 5 illustrates multiple content items 510, 540 positioned at 3D positions in the XR environment after being copied/moved from the user interface 230 of the content application. Content item 510 corresponds to text 310 and content item 540 corresponds to image 240. These content items are viewed at 3D positions within the XR environment and can be viewed, interacted with, and otherwise used separately from the user interface 230 of the source content application from which they came. Moreover, the content items 510, 540 now exist in the XR environment/application independently from the content application and its user interface 230.

Figure 6:
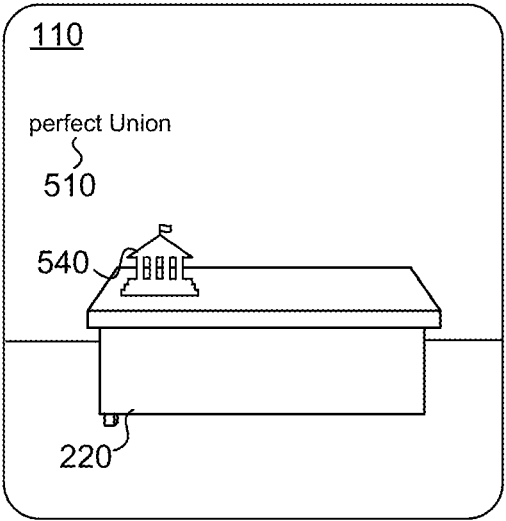
FIG. 6 illustrates the content items of FIG. 5 persisting in the XR environment after the removal of the user interface in accordance with some implementations.

Accordingly, as illustrated in FIG. 6, the content items 510, 540 persist in the XR environment after the removal of the user interface 230, e.g., after execution of the content application is halted and/or its user interface 230 is removed from the XR environment.

Figure 7:
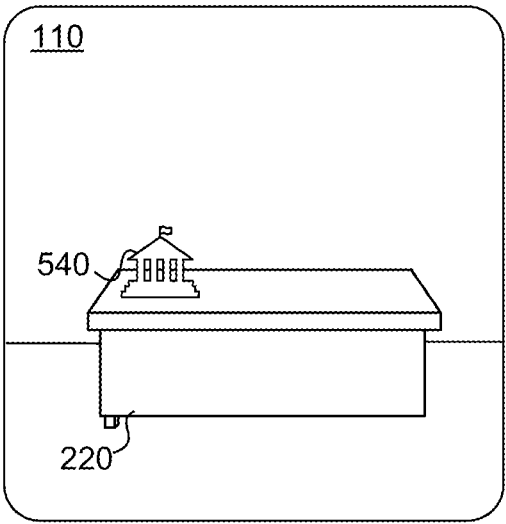
FIG. 7 illustrates some of the content items of FIG. 5 persisting in the XR environment after a condition occurs in accordance with some implementations.

In some implementations and/or for some circumstances, one or more of the content items 510, 540 persists only until a condition is satisfied. For example, some types of content items and/or content items positioned in certain places may persist until the occurrence of a condition or for only a limited time, e.g., 5 minutes, 6 hours, 1 day, 1 week, etc. For example, FIG. 7 illustrates that content item 510 has been removed from the XR environment based on the occurrence of a condition, while content item 540 persists in the XR environment after the occurrence of that condition, e.g., after 10 minutes has passed, after the XR environment has been suspended/closed, etc. Whether and/or for how long a content item persists may depend upon context, e.g., the type of content item, where it is positioned, whether it is positioned on a surface, in mid-air, anchored to an object/app, the user's preferences, the type of application from which the content was sourced, content-item specific attributes (e.g., persistence tags), etc.

In some implementations and/or some circumstances, one or more transient (non-persistent) items are automatically removed by the system. In addition, the user may be enabled to manually remove persistent and/or transient items, for example, if the user decided that they no longer want them or moved an item by mistake.

Figure 8:
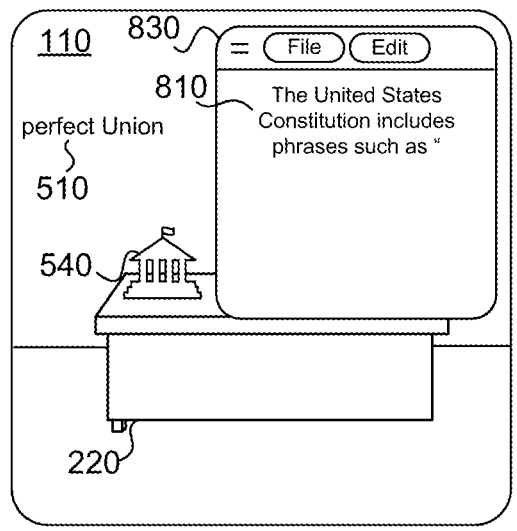
FIG. 8 illustrates a second user interface of a second content application in the XR environment of FIGS. 2-6 in accordance with some implementations.

FIG. 8 illustrates a second user interface 830 of a second content application in the XR environment of FIGS. 2-6. In this example, content items 510, 540 have already been placed at 3D positions within the XR environment. A second content application has then been executed and provides the second user interface 830 in the XR environment. In this example, the second user interface 830 includes word processing tools and features and has text content 810 already in a document that is being created and edited.

Figure 9:
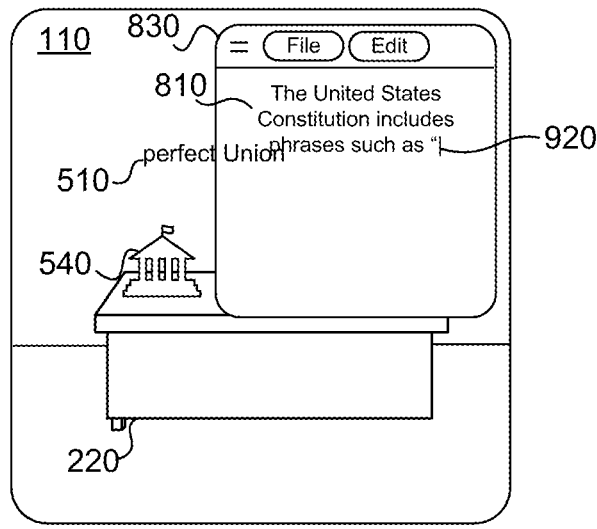
FIG. 9 illustrates a movement of a content item from the surrounding XR environment to the user interface of the second content application of FIG. 8 in accordance with some implementations.

FIG. 9 illustrates a copying/movement of a content item 510 from the surrounding XR environment into the second user interface 830. Such copying/movement may be the result of input selecting the content item 510 and moving it within the 3D space of the XR environment. Such input may take a variety of forms including, but not limited to, input provided via a body movement such as a hand gesture, input based on a gaze direction or eye movement, input based on movement of device 110 or a separate device, input based on a verbal command, input based on use of a virtual input device (e.g., a virtual keyboard), or any combination of such inputs. Based on movement of the content item 510 into (e.g., within a threshold distance of, touching, etc.), the content item 510 is made available to the second content application and may be inserted into or otherwise used by the second user interface 830 of the second content application. In this example, as the content item 510 is moved to a position proximate to (within a first threshold distance but not yet touching or not yet within a second threshold distance of) the second user interface 830, an indicator 920 is presented to indicate where the content item 510 will be inserted into the user interface. In this case, the content item 510 will be positioned based on a current cursor position within a document being created. In one example, such an indicator is provided as a user drags (but before the user drops) the content item 510.

Figure 10:
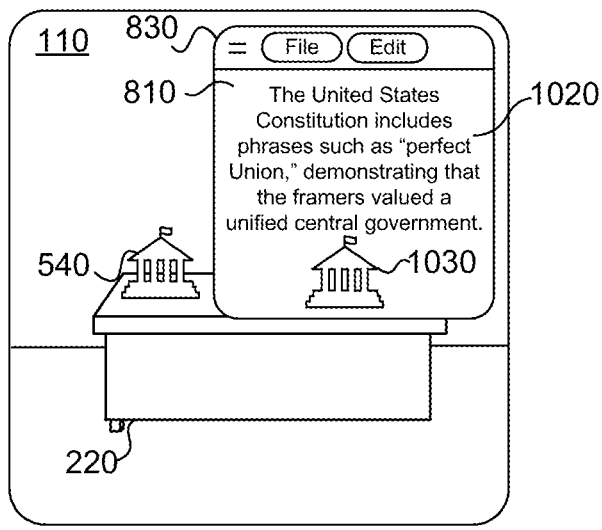
FIG. 10 illustrates use of the moved content item of FIG. 9 within the user interface of the second content application of FIGS. 8 and 9 in accordance with some implementations.

FIG. 10 illustrates use of the moved content item 510 within the user interface of the second content application 830. In this example, the content item 510 (e.g., text "perfect Union") has been inserted into other content in the document being created/edited via the second user interface 830. Similarly, content item 540 has been inserted as content 1030 into the document within the second user interface 830. Note that in this example, the content item 510 is cut (e.g., removed) from its position in the XR application as it is moved to the second user interface 830, while the content item 540 persists and a copy is inserted into the second user interface 830. Whether a content item is cut or remains (e.g., persists) may depend upon context, e.g., the type of content, its position, a user preference, etc.

Figure 11:
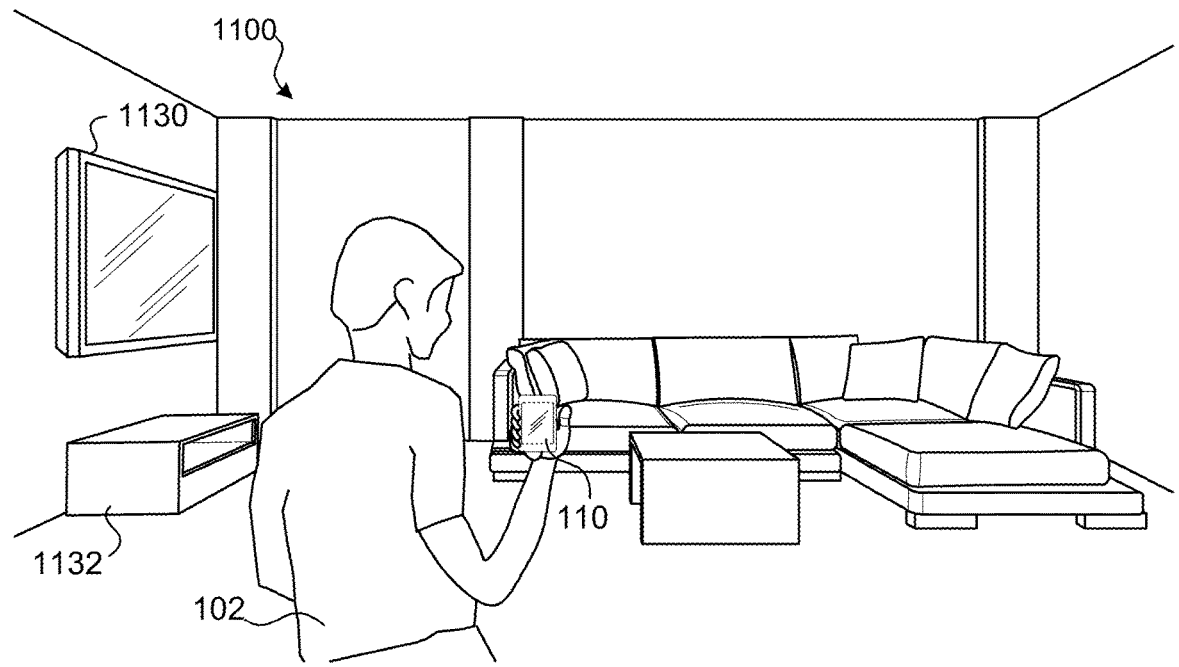
FIG. 11 illustrates an exemplary electronic device operating in a physical environment in accordance with some implementations.

FIG. 11 illustrates an exemplary electronic device 110 operating in a physical environment 1100. In this example of FIG. 11, the physical environment 1100 is a room that includes a television 1130 and a shelf 1132 located near the television 1130. The electronic device 110 includes one or more cameras, microphones, depth sensors, or other sensors that can be used to capture information about and evaluate the physical environment 1100 and the objects within it, as well as information about the user 102 of the electronic device 110. The information about the physical environment 1100 and/or user 102 may be used to provide visual and audio content and/or to identify the current location of the physical environment 1100 and/or the location of the user 102 within the physical environment 1100. In some implementations, views of an XR environment may be provided to one or more participants (e.g., user 102 and/or other participants not shown). Such an XR environment may include views of a 3D environment that is generated based on camera images and/or depth camera images of the physical environment 1100 as well as a representation of user 102 based on camera images and/or depth camera images of the user 102. Such an XR environment may include virtual content.

Figure 12:
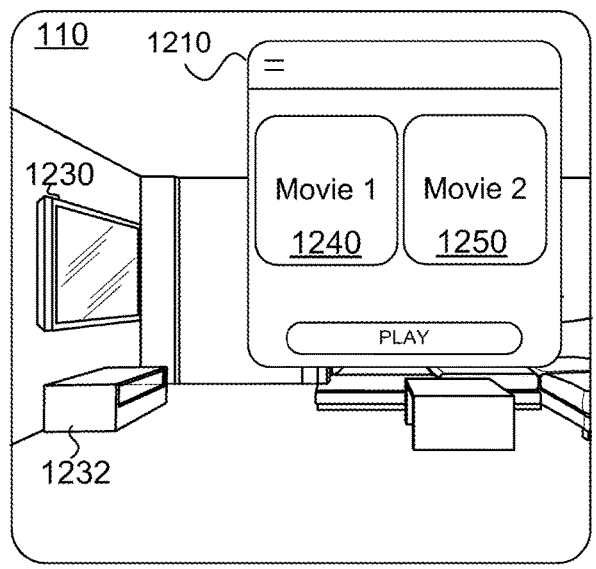
FIG. 12 illustrates a view of an XR environment provided by the device of FIG. 11 including an exemplary user interface of a content application in accordance with some implementations.

FIG. 12 illustrates a view of an XR environment provided by the device 110 of FIG. 11 including an exemplary user interface 1210 of a content application. Providing such a view may involve determining 3D attributes of the physical environment 1100 and positioning virtual content, e.g., user interface 1210, in a 3D coordinate system corresponding to that of physical environment 1100. In the example of FIG. 2, the user interface 1210 includes various content items, including a first movie 1240 and a second movie 1250 that can be viewed with the user interface 1210. For example, the user interface 1230 may be a video viewing user interface.

Figure 13:
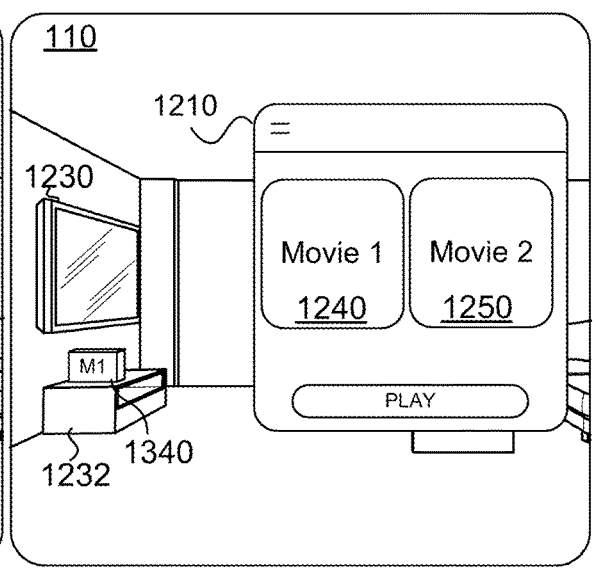
FIG. 13 illustrates a content item of the user interface of FIG. 12 copied to a separate position within the XR environment in accordance with some implementations.

FIG. 13 illustrates a copy 1340 of the content item 1240 of the user interface of FIG. 12 copied from within the user interface 1210 of the content application to a separate 3D position within the XR environment. In this example, the copy 1340 of the content item 1240 will persist within the XR environment until a condition is satisfied, e.g., the user deletes, cuts, or moves the copy 1340, and thus will persist for an indefinite period of time even if the device 110 is powered off and then powered back on. The copy 1340 may be present in any future XR environment that is generated based on the physical environment 1110. For example, based on determining that the user is within the physical environment 1110, the copy may automatically be positioned at its position within a view of that XR environment until the condition occurs. In another example, the copy 1340 is anchored to a particular object within that environment 1110 and will be presented (and thus persist) as long as that object is recognized. If such an object is moved within the room or even to another room and is recognized (e.g., uniquely identified), the anchored content can be presented along with it.

In the example of FIGS. 12-13, the user intends to position multiple movies on the top surface of the depiction 1232 of the shelf 1132 below the depiction 1230 of the television 1130. Thus, the 3D positioning of virtual content items may be such that the position is indicative of a type or other attribute of the content, e.g., the position proximate the TV is indictive of that the content is video content. A user may position an entire collection of content items (e.g., a movie collection) or otherwise organize content items by associating those content items with particular objects, spaces, rooms, or other spatial organizations.

In some implementations, the system is configured to enable a user to play one of a set of saved movies on the physical television 1130 in the room. This may involve sending the movie content itself and/or remotely controlling the television 1130 by sending instructions via a wired or wireless network. Doing so is an example of a way of showing other people in the room (who may or may not also be using their own electronic devices to participate in the XR environment), to watch a movie with the user. In one example, the user is enabled to drag a movie from the shelf directly onto the television 1130 (e.g., a depiction of the television 1130 that the user views in their view of the XR environment) to begin playback. Such an interaction may be intuitive since it is similar to interactions with real movie viewing devices, e.g., similar to putting a DVD in a DVD player in the physical world.

In some implementations, multiple users are able to experience one or more aspects of the same XR environment, e.g., a second user visiting the user 102 may experience the XR environment and see the movie collection of the user 102 on the top surface of the depiction 1232 of the shelf 1132. The second user may be enabled to interact with content items in the XR environment, e.g., by copying such items to his or her own applications/application user interfaces for use. Elements of an XR environment may be provided by multiple devices, e.g., one device may provide one virtual element and another device may provide another virtual element. In a shared environment, a first device may position content from a content application at a 3D position within such a shared environment. When the second device (e.g., via user input) selects, moves, copies, drags and drops, etc. that content into their device's own application's user interfaces, a copy of the content may be sent from the first device to second device and made available to that content application executing on the second device.

Figure 14:
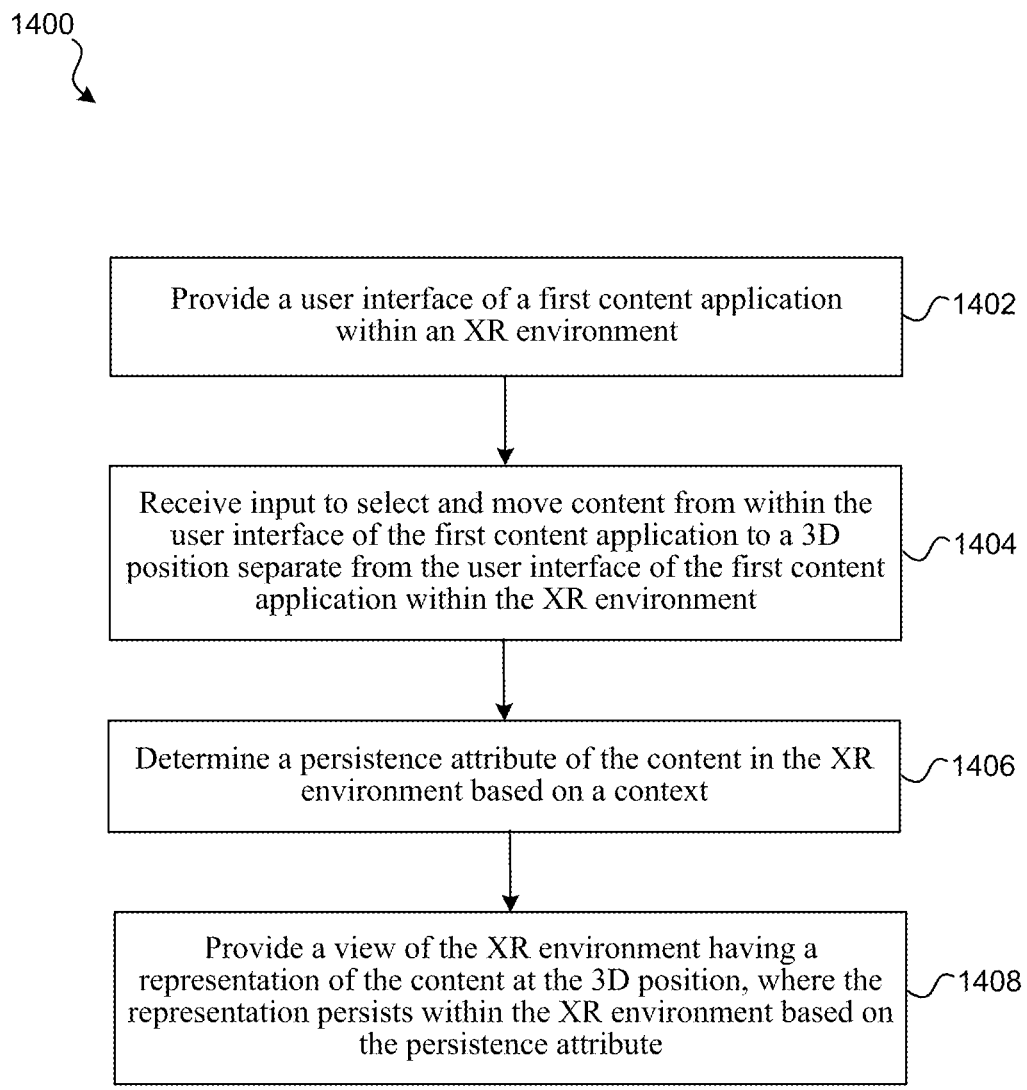
FIG. 14 is a flowchart illustrating a method for coordinating the use of application content in XR environments in accordance with some implementations.

FIG. 14 is a flowchart illustrating a method 1400 for coordinating the use of application content in XR environments in accordance with some implementations. In some implementations, a device such as electronic device 110 performs method 1400. In some implementations, method 1400 is performed on a mobile device, desktop, laptop, HMD, or server device. The method 1400 is performed by processing logic, including hardware, firmware, software, or a combination thereof. In some implementations, the method 1400 is performed on a processor executing code stored in a non-transitory computer-readable medium (e.g., a memory).

At block 1402, the method 1400 provides a user interface of a first content application (e.g., a web browser) within an XR environment. The first content application may be one of multiple content applications that are individually executable to provide user interfaces at three-dimensional (3D) positions within the XR environment. For example, the first content application may be executable by an operating system/XR environment application that provides the XR environment and enables multiple applications to execute and use their own content items, while restricting access to such content by other applications. Accordingly, an XR environment may be provided by an operating system configured to individually execute multiple content applications, where the multiple content applications are executed and use content items that are inaccessible to other applications from within those other applications.

At block 1404, the method 1400 receives input (e.g., a drag/drop gesture/command) to select and move content from within the user interface of the first content application to a 3D position separate from the user interface of the first content application within the XR environment. The content may be any type of electronic content usable via an application including, but not limited to, an image, a text string, a video, a uniform resource locator, a bookmark, a contact, a file, a 3D model, or a tool configured to provide functionality in applications of different type.

The 3D position may be a fixed position with respect to a physical environment represented by the XR environment. The 3D position may be a non-fixed position anchored to a movable physical object or a movable virtual object of the XR environment such that the content moves with the object to which it is anchored. The 3D position may be determined based on identifying a collection of content items having a same type as the content (e.g., a movie may be automatically positioned next to other movies on the nearby shelf). The 3D position may be determined based on user input, e.g., a user selection of a particular 3D position. The 3D position may be selected as a closest available position, e.g., the closest surface, horizontal surface, etc., to a 3D position that the user identifies. In some implementations, the 3D position is automatically selected based on user specified criteria and/or context information.

In some implementations, based on the input to select and move the content, an indication of available 3D positions within the XR environment for the content to be placed. FIG. 4 provides examples of such indicators.

At block 1406, the method 1400 determines a persistence attribute of the content in the XR environment based on a context. In some implementations, the context identifies the 3D position and/or 3D relationships to other real and/or virtual objects. In some implementations, the context identifies a type of content and/or a type of application from which the content was pulled. Accordingly, the persistence attribute may be determined, as examples, based on the 3D position of the content in the XR environment, whether the 3D position of the content in the XR environment is associated with a surface (e.g., on the surface v. in the air), and/or whether the content is anchored to a second content application in the XR environment. As another example, the persistence attribute may be determined based on the type of the content, e.g., whether the content is text, an image, a URL, a video, a 3D model, etc.

At block 1408, the method 1400 provides a view of the XR environment that includes a representation of the content at the 3D position, where the representation persists within the XR environment based on the persistence attribute. The persistence attribute may be used to determine a length of time that the content will persist in the XR environment absent user interaction with the content, e.g., deleting, moving, or cutting the content. The persistence attribute may be used to determine an event (e.g., closing the source application, shutting the device down, initiating a shared session, the user leaving the physical environment, etc.) that will conclude the persistence of the content in the XR environment absent user interaction.

In some implementations, the method 1400 further involves receiving a second input (e.g., a second drag/drop gesture/command) to select and move the content from the 3D position to a second user interface of a second content application within the XR environment and providing the content for use via the second content application based on the second input. For example, the first content application may be a web browsing application and the second content application may be a messaging application, an e-mail application, or a document creation application. The second input may copy the content (that was copied out of the first application's user interface into the XR environment) from the XR environment and into the second application's user interface.

In some implementations, the XR environment is a shared environment and the input to select and move the content shares the content with one more other users of the shared environment. Such shared content positioned at a 3D position in the XR environment may be accessed (e.g., viewed, copied onto another device, etc.) via user interactions from the second device with the XR environment.

Figure 15:
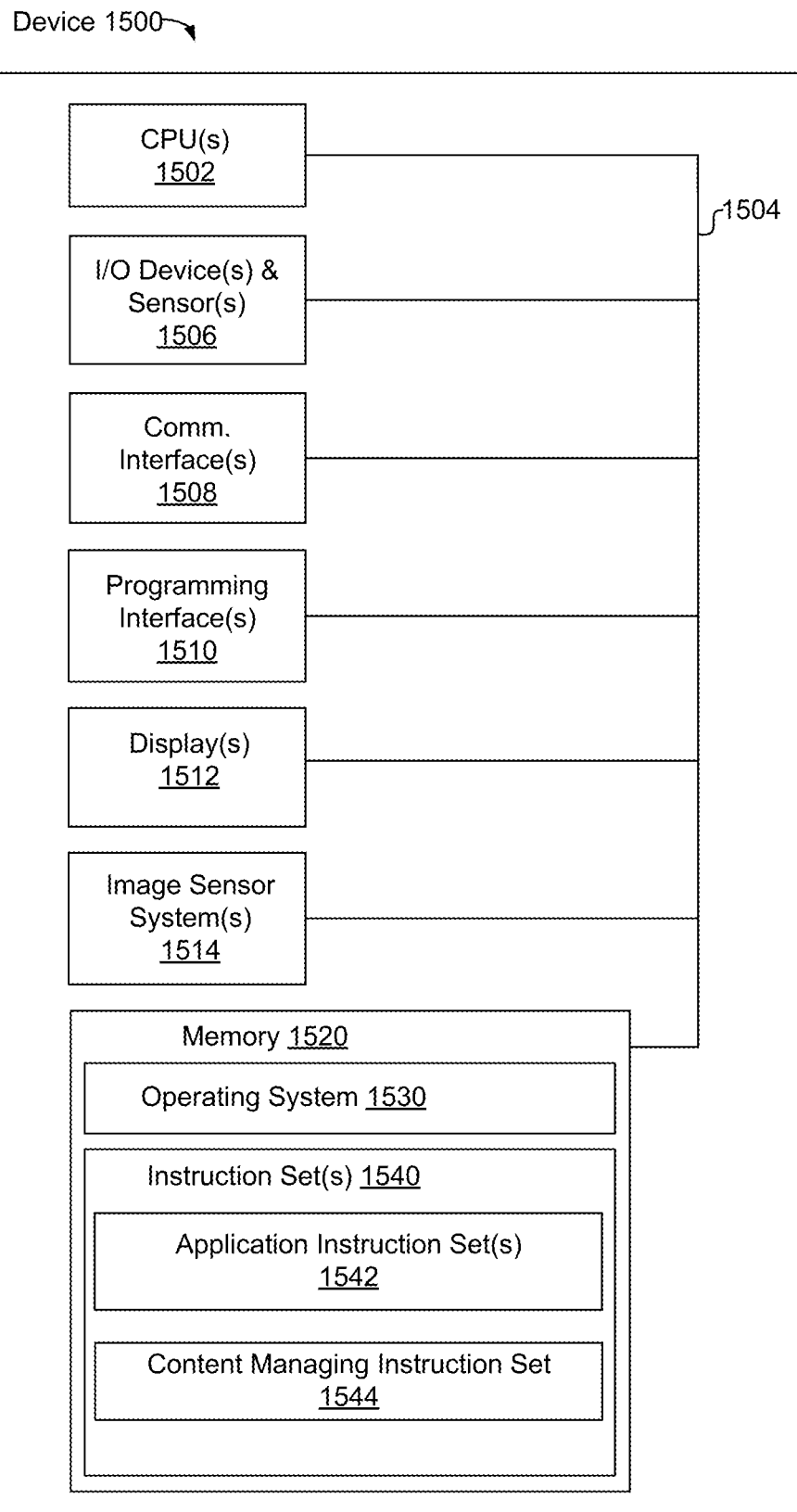
FIG. 15 is a block diagram of an electronic device of in accordance with some implementations.

FIG. 15 is a block diagram of electronic device 1500. Device 1500 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1500 includes one or more processing units 1502 (e.g., microprocessors, ASICs, FPGAs, GPUs, CPUs, processing cores, and/or the like), one or more input/output (I/O) devices and sensors 1506, one or more communication interfaces 1508 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, 12C, and/or the like type interface), one or more programming (e.g., I/O) interfaces 1510, one or more output device(s) 1512, one or more interior and/or exterior facing image sensor systems 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1512 include one or more displays configured to present a view of a 3D environment to the user. In some implementations, the one or more displays 1512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1500 includes a single display. In another example, the device 1500 includes a display for each eye of the user.

In some implementations, the one or more output device(s) 1512 include one or more audio producing devices. In some implementations, the one or more output device(s) 1512 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1512 may additionally or alternatively be configured to generate haptics.

In some implementations, the one or more image sensor systems 1514 are configured to obtain image data that corresponds to at least a portion of a physical environment. For example, the one or more image sensor systems 1514 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1514 further include illumination sources that emit light, such as a flash. In various implementations, the one or more image sensor systems 1514 further include an on-camera image signal processor (ISP) configured to execute a plurality of processing operations on the image data.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 comprises a non-transitory computer readable storage medium.

In some implementations, the memory 1520 or the non-transitory computer readable storage medium of the memory 1520 stores an optional operating system 1530 and one or more instruction set(s) 1540. The operating system 1530 includes procedures for handling various basic system services and for performing hardware dependent tasks. In some implementations, the instruction set(s) 1540 include executable software defined by binary information stored in the form of electrical charge. In some implementations, the instruction set(s) 1540 are software that is executable by the one or more processing units 1502 to carry out one or more of the techniques described herein.

The instruction set(s) 1540 include application instruction set(s) 1542 configured to, upon execution, anchor and/or provide user interfaces of one or more content applications within an XR environment as described herein. The instruction set(s) 1540 further include a content managing instruction set 1544 configured to, upon execution, manage content used by one or more content applications executing via an XR environment as described herein. The instruction set(s) 1540 may be embodied as a single software executable or multiple software executables.

Although the instruction set(s) 1540 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a processor of a device:
providing a user interface of a first content application within an extended reality (XR) environment, wherein the first content application is one of multiple content applications that are individually executable to provide user interfaces at three-dimensional (3D) positions within the XR environment;
receiving input to select and move content from within the user interface of the first content application to a 3D position separate from the user interface of the first content application within the XR environment;
determining a persistence attribute of the content in the XR environment based on a context, wherein the persistence attribute specifies how long the content will persist in the XR environment based on a condition and the context is determined based on the 3D position within the XR environment; and
providing a view of the XR environment comprising a representation of the content at the 3D position, wherein the representation persists within the XR environment based on the persistence attribute.

2. The method of claim 1, wherein the persistence attribute is determined based on:
the 3D position of the content in the XR environment;
whether the 3D position of the content in the XR environment is associated with a surface;
whether the content is anchored to a second content application in the XR environment, the second content application different than the first content application; or
a type of the content.

3. The method of claim 1, wherein the persistence attribute determines:
a length of time that the content will persist in the XR environment absent user interaction; or
an event that will conclude the persistence of the content in the XR environment absent user interaction.

4. The method of claim 1, wherein the 3D position is:
a fixed position with respect to a physical environment represented by the XR environment; or
a non-fixed position anchored to a physical object or a virtual object of the XR environment.

5. The method of claim 1, wherein the XR environment is provided by an operating system configured to individually execute the multiple content applications, wherein the multiple content applications are executed and use content items that are inaccessible to other applications from within a respective application.

6. The method of claim 1 further comprising:
receiving a second input to select and move the content from the 3D position to a second user interface of a second content application within the XR environment; and
providing the content for use via the second content application based on the second input.

7. The method of claim 1, wherein the XR environment is a shared environment and the input to select and move the content shares the content with one more other users of the shared environment.

8. The method of claim 1 further comprising, based on the input to select and move the content, providing an indication of available 3D positions within the XR environment for the content to be placed.

9. The method of claim 1, wherein the condition is a specified length of time.

10. The method of claim 1, wherein the condition is an event, and the event is an end of a current XR session or a user activity expressly ending the persistence.

11. The method of claim 1, wherein the context is determined based on a state of the XR environment or a user activity within the XR environment.

12. The method of claim 1, wherein the persistence attribute is determined based on whether the 3D position is on a surface in the XR environment.

13. The method of claim 1, wherein the persistence attribute is determined based on whether the 3D position is in the air, separate from any surface, in the XR environment.

14. The method of claim 1, wherein the representation of the content at the 3D position within the XR environment has a different form than the content within the user interface of the first content application.

15. The method of claim 1, wherein the 3D position of the content is indicative of an attribute of the content.

16. The method of claim 1, wherein the 3D position of the content is indicative of a type of the content.

17. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
providing a user interface of a first content application within an extended reality (XR) environment, wherein the first content application is one of multiple content applications that are individually executable to provide user interfaces at three-dimensional (3D) positions within the XR environment;
receiving input to select and move content from within the user interface of the first content application to a 3D position separate from the user interface of the first content application within the XR environment;
determining a persistence attribute of the content in the XR environment based on a context, wherein the persistence attribute specifies how long the content will persist in the XR environment based on a condition and the context is determined based on the 3D position within the XR environment; and
providing a view of the XR environment comprising a representation of the content at the 3D position, wherein the representation persists within the XR environment based on the persistence attribute.

18. The system of claim 17, wherein the persistence attribute is determined based on:
the 3D position of the content in the XR environment;
whether the 3D position of the content in the XR environment is associated with a surface;
whether the content is anchored to a second content application in the XR environment, the second content application different than the first content application; or
a type of the content.

19. The system of claim 17, wherein the persistence attribute determines:
a length of time that the content will persist in the XR environment absent user interaction; or
an event that will conclude the persistence of the content in the XR environment absent user interaction.

20. The system of claim 17, wherein the 3D position is:
a fixed position with respect to a physical environment represented by the XR environment; or a non-fixed position anchored to a physical object or a virtual object of the XR environment.

21. The system of claim 17, wherein the XR environment is provided by an operating system configured to individually execute the multiple content applications, wherein the multiple content applications are executed and use content items that are inaccessible to other applications from within a respective application.

22. The system of claim 17, wherein the operations further comprise:
receiving a second input to select and move the content from the 3D position to a second user interface of a second content application within the XR environment; and
providing the content for use via the second content application based on the second input.

23. The system of claim 17, wherein the XR environment is a shared environment and the input to select and move the content shares the content with one more other users of the shared environment.

24. The system of claim 17, wherein the operations further comprise, based on the input to select and move the content, providing an indication of available 3D positions within the XR environment for the content to be placed.

25. A non-transitory computer-readable storage medium storing program instructions executable via one or more processors to perform operations comprising:
providing a user interface of a first content application within an extended reality (XR) environment, wherein the first content application is one of multiple content applications that are individually executable to provide user interfaces at three-dimensional (3D) positions within the XR environment;
receiving input to select and move content from within the user interface of the first content application to a 3D position separate from the user interface of the first content application within the XR environment;
determining a persistence attribute of the content in the XR environment based on a context, wherein the persistence attribute specifies how long the content will persist in the XR environment based on a condition and the context is determined based on the 3D position within the XR environment; and
providing a view of the XR environment comprising a representation of the content at the 3D position, wherein the representation persists within the XR environment based on the persistence attribute.

26. The non-transitory computer-readable storage medium of claim 25, wherein the persistence attribute is determined based on:
the 3D position of the content in the XR environment;
whether the 3D position of the content in the XR environment is associated with a surface;
whether the content is anchored to a second content application in the XR environment, the second content application different than the first content application; or
a type of the content.

27. The non-transitory computer-readable storage medium of claim 25, wherein the persistence attribute determines:
a length of time that the content will persist in the XR environment absent user interaction; or
an event that will conclude the persistence of the content in the XR environment absent user interaction.

28. The non-transitory computer-readable storage medium of claim 25, wherein the 3D position is:
a fixed position with respect to a physical environment represented by the XR environment; or
a non-fixed position anchored to a physical object or a virtual object of the XR environment.

29. The non-transitory computer-readable storage medium of claim 25, wherein the XR environment is provided by an operating system configured to individually execute the multiple content applications, wherein the multiple content applications are executed and use content items that are inaccessible to other applications from within a respective application.

30. The non-transitory computer-readable storage medium of claim 25, wherein the operations further comprise:
receiving a second input to select and move the content from the 3D position to a second user interface of a second content application within the XR environment; and
providing the content for use via the second content application based on the second input.

31. The non-transitory computer-readable storage medium of claim 25, wherein the XR environment is a shared environment and the input to select and move the content shares the content with one more other users of the shared environment.

32. The non-transitory computer-readable storage medium of claim 25, wherein the operations further comprise, based on the input to select and move the content, providing an indication of available 3D positions within the XR environment for the content to be placed.

* * * * *